United States Patent Office 3,798,234
Patented Mar. 19, 1974

3,798,234
PROCESS FOR THE PREPARATION OF
3-ANILINO-PYRAZOLONES-(5)
Ernst Meier and Karl Kuffner, Munich, and Hans Glockner, Pullach, Germany, assignors to Agfa-Gevaert Aktiengesellschaft, Leverkusen, Germany
No Drawing. Filed Aug. 27, 1971, Ser. No. 175,701
Claims priority, application Germany, Aug. 29, 1970,
P 20 42 920.3
Int. Cl. C07d 49/16
U.S. Cl. 260—310 A                    6 Claims

ABSTRACT OF THE DISCLOSURE

Preparation of 3-anilino-pyrazolone-(5) of the general formula

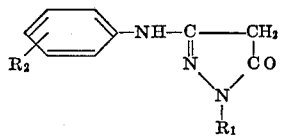

by reacting a $\beta,\beta,\beta$-trialkoxy propionic acid alkyl ester of the general formula

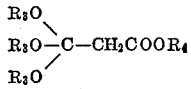

with a substituted aniline, and condensation of the intermediate product with a hydrazine of the formula

$R_1$ is an alkyl, aralkyl or aryl, substituted or unsubstituted, group
$R_2$ is H or alkyl, alkoxy, alkylthio, halogen, carboxy sulfo acid, alkylsulfonic, carbamido, acylamino, sulfofluorido, cyano, or nitro group
$R_3$ and $R_4$ are a short chain alkyl group.

BACKGROUND OF THE INVENTION

The invention relates to a novel process for the preparation of 3-anilinopyrazolones-(5). These compounds are important intermediate products for the preparation of purple images in photographic multi-color materials according to the principle of chromogenic development.

There exist a line of methods for the preparation of 3-anilino-pyrazolones-(5), as they are disclosed, for example, in the patents U.S. 2,343,703, Russia 141,485, Belgium 670,949, Germany 1,176,478 and 1,237,580, France 1,449,259 and 1,469,360. Some of these processes give insufficient yields; others fail completely when using certain aniline residues. To these anilines pertain such with acid substituents, such as the SO₃H group, and above all when several of these groups are present.

SUMMARY OF THE INVENTION

According to the invention, it has been found that 3-anilino-pyrazolone-(5) of the general formula

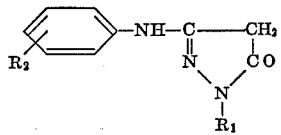

may be prepared by reacting a $\beta,\beta,\beta$-trialkoxy propionic acid alkyl ester of the general formula

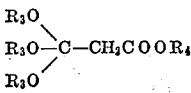

with an aniline of the formula

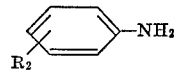

and condensation of the intermediate product obtained with a hydrazine of the formula

In these formulae
$R_1$ is alkyl, aralkyl, aryl, if necessary substituted by one or several alkyl-, alkoxy-, alkylthio-, phenoxy-, halogen-, carboxy-, sulfo acid-, alkylsulfonic-, carbalkoxy-, carbamide-, sulfofluoride-, cyano-, nitro groups
$R_2$ is H or one or several substituents such as an alkyl-, alkoxy-, alkylthio-, halogen-, carboxy-, sulfo acid-, alkylsulfonic-, carbamido-, acylamino-, sulfofluorido-, cyano-, nitro group
$R_3$ and $R_4$ are alkyl with from 1 to 4 carbon atoms.

The $\beta,\beta,\beta$-trialkoxy propionic acid esters, used according to the invention, may also be designated chemically as semiorthoesters of malonic acid. A compound of this sort of $\beta,\beta,\beta$-triethylpropionic acid ethyl esters is described by McElvain, Schroeder, Am. Soc. 71, 1949, pp. 44-45. The corresponding trimethoxy propionic acid ethyl ester is very stable in pure form and may be employed particularly well according to the invention.

The particular advantage of the new process is that with the aid of such ortho esters, even acid anilines, such as sulfanilines for example, may be called upon with good yield for the synthesis of 3-anilinopyrazolones-(5).

Quite generally, the following anilines may for example be reacted with the orthoesters: Aniline, 4-chloraniline, 2,4-dichloraniline, m-toluidine, p-dodecylaniline, m-nitroaniline, sulfanilic acid, 2-amino-4-nitrobenzene sulfonic acid, 2-nitro-4-aminobenzene sulfonic acid, 2-nitro-4-chlor-5-aminobenzene sulfonic acid.

The reaction of the anilines with the orthoester takes place at temperatures betwen 20 and 100° C., preferably in the presence of glacial acetic acid. The yields of the intermediate product obtained, $\beta$-alkoxy-$\beta$-anilino acrylic acid ester, are nearly quantitative. In most instances, a purification with hydrazine prior to the reaction is eliminated.

Suitable hydrazines for a pyrazalone synthesis are, for example, phenyl hydrazine, m-chlorphenyl hydrazine, 2,4,6-trichlorophenyl hydrazine, p-nitrophenyl hydrazine, 2-nitro-4-trifluoromethylphenyl hydrazine, 2-cetyloxyphenyl hydrazine, 4-hydrazino-phenyl-cetylsulfone, 4-chloro-5-hydrazino-phenylchloromethylsulfone, phenylhydrazine-m-sulfonic acid, ethyl-hydrazine, benzyl hydrazine, 2-chlorobenzyl hydroazine.

It is an object of this invention to prepare compounds which are suitable as purple couplers for color-photographic multilayer materials.

It is a further object of this invention to provide couplers, together with suitable substituents, such as a diffusion-proof residue, for example, resulting in valuable intermediate products for the synthesis of diffusion-proof purple components.

Detailed description of the invention

The following examples serve for a more detailed explanation of the invention:

EXAMPLE 1

Preparation of $\beta,\beta,\beta$-trimethoxy propionic acid ethyl ester

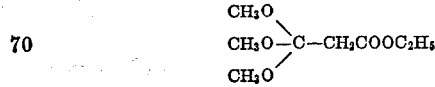

While stirring, 200 g. β-ethoxy-β-imino-propionic acid ethyl ester·HCl were dissolved in 1 l. methanol. After 48 hours, the precipitated NH₄Cl was drawn off and the methanol evaporated, under reduced pressure, up to 300 ml. residue. The residue was stirred into a mixture of 1 l. methylene chloride and 1 l. water. The methylene chloride film was washed with water until all NH₄Cl was removed. After the drying of the methylene chloride solution, the solvent was distilled off and the residue fractionated under reduced pressure.

The constitution of this compound was confirmed by nuclear resonance measurement.

EXAMPLE 2

Preparation of 1(2',4',6'-trichlorophenyl)-3-(p-sulfoanilino)-pyrazolone-(5)

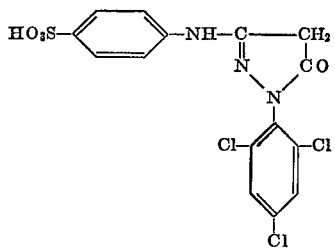

3.9 g. sulfanilic acid-Na-salt, fine-milled and dried, 10 ml. acetic acid, 6.6 ml. β,β,β-trimethoxy propionic acid ethyl ester were stirred for 15 min. at 70–80° C. bath temperature. Subsequently, the acetic acid was evaporated under reduced pressure. The residue was stirred at room temperature in 15 ml. acetic acid with 4.20 g. 2,4,6-trichlorophenyl hydrazine. After 3 hours, the resulting deposit was drawn off and washed with alcohol. The moist deposit was suspended in 40 ml. water and was brought into solution with NaOH 2 N to pH 8. The insoluble turbidity was removed by filtration. After addition of further 10 ml. NaOH 2 N, this was heated for 10 minutes at 50° C. The pyrazolone was precipitated by acidifying with concentrated HCl.

Yield: 3.5 g., i.e. 40% of the theoretical.

EXAMPLE 3

Preparation of 1(2',4',6'-trichlorophenyl)-3-(3''-nitro-6''-sulfoanilino)-pyrazolone-(5) Na-salt

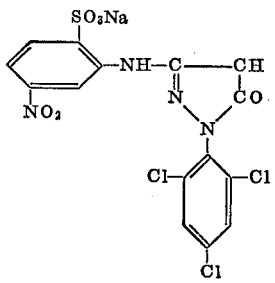

48 g. 2-amino-4-nitro-benzene sulfonic acid Na-salt, fine-milled, and dried, were stirred with 8.2 g. sodium acetate, anhydrous, 100 ml. acetic acid, 66 ml. β,β,β-trimethoxypropionic acid ethyl ester at a bath temperature of 70–80° C. until dissolved. Subsequently, the acetic acid was distilled off under reduced pressure. The viscous residue was dissolved in 850 ml. methanol and heated at the water bath with 42.3 g. 2,4,6-trichlorophenyl hydrazine (pulverized). After all was dissolved, 40 ml. acetic acid were added. After 15 minutes, the resulting crystal mass was cooled, drawn off, and washed with methanol.

Toward the end of the pyrazolone cycle, the moist precipitate was stirred for 90 minutes at room temperature in 200 ml. methanol with the addition of 2.5 equiv. Na-methylate solution. From the clear red solution, 50 g. pyrazolone, i.e., 50% of the theoretical, was precipitated with the acidifying acetic acid.

EXAMPLE 4

Preparation of 1(2',4',6'-trichlorophenyl)-3-(m-nitroanilino)-pyrazolone-(5)

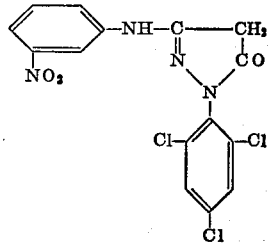

27.6 g. m-nitroaniline were stirred at room temperature for 1 hour with 100 ml. acetic acid, 56 ml. β,β,β-trimethoxy-propionic acid ethyl ester. The acetic acid was distilled off under reduced pressure and the residue was dissolved in 400 ml. methanol. After addition of 42 g. 2,4,6-trichlorophenylhydrazine and 40 ml. acetic acid, it was heated at a water bath. After 20 min. it was cooled, the resulting precipitate was drawn off and washed with methanol.

The precipitate, moist with methanol, was dissolved in 250 ml. methanol and 2 equivalents Na-methylate solution and heated for 15 minutes at a water bath. The pyrazolone was precipitated by acidifying with acetic acid.

Yield: 35 g. i.e. 40% of the theoretical.

EXAMPLE 5

Preparation of 1(4'-nitrophenyl)-3-(o-tetradecyloxyanilino)-pyrazolone-(5)

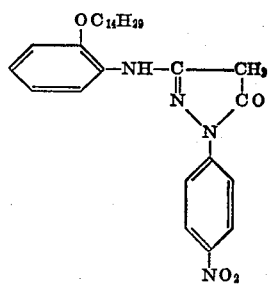

6.1 g. tetradecyloxyaniline, 10 ml. acetic acid, 5.6 ml. β,β,β-trimethoxy-propionic acid ethyl ester were stirred at room temperature for 1 hour. Subsequently, the acetic acid was distilled off under reduced pressure. The residue was stirred with 15 ml. acetic acid and 3.06 g. p-nitrophenyl hydrazine for 30 minutes at 30–40° C. and for 90 minutes at 80–90° C. bath temperature. The resulting thick crystal mass was stirred with methanol and drawn off. The resulting product represents already the desired pyrazolone.

Yield: 0.2 g., i.e. 61% of the theoretical.

What is claimed is:

1. A process for the preparation of 3-anilino-pyrazolone-(5) having the structure:

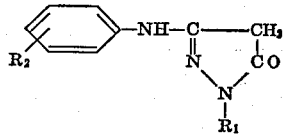

which comprises reacting a β,β,β-trialkoxy propionic acid alkyl ester of the formula

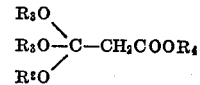

with an aniline of the formula

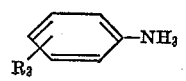

in the presence of glacial acetic acid as a condensation agent temperatures between 20 and 100° C. with subsequent evaporation of the agent at reduced pressure, and subsequently obtaining an intermediate product with a hydrazine of the formula:

$$R_1\text{—NH—NH}_2$$

to form the said 3-anilino-pyrazolones-(5) product and subsequently recovering the resultant product, wherein:

$R_1$ is selected from the group consisting of lower alkyl; benzyl; halobenzyl; phenyl; and phenyl substituted with 1–2 substituents selected from the group consisting of sulfo, carboxy, alkoxy of 1–16 carbon atoms, phenoxy, halogen, cyano, nitro, and alkylsulfonyl, wherein the alkyl is of from 1 to 16 carbon atoms;

$R_2$ is selected from the group consisting of hydrogen, alkyl of from 1 to 12 carbon atoms, alkoxy of from 1 to 14 carbon atoms, halogen, nitro, cyano, and sulfo;

$R_3$ and $R_4$ represent alkyl of from 1 to 4 carbon atoms.

2. A process for the preparation of 3-anilino-pyrazolone-(5) of claim 1, characterized in that the reaction of the $\beta,\beta,\beta$-trialkoxy propionic acid alkyl ester with the aniline is carried out at a temperature between 70 and 80° C. in the presence of glacial acetic acid as a condensation agent.

3. The process according to claim 1 wherein the $R_2$ substituent is a nitro group.

4. The process according to claim 1 wherein the $R_2$ substituent is a sulfo acid group.

5. A process for the preparation of 3-anilino-pyrazolone-(5) of claim 1, characterized in that a nitro-aniline sulfonic acid is employed as the aniline.

6. A process for the preparation of 3-anilino-pyrazolone-(5) of claim 1, characterized in that $\beta,\beta,\beta$-trimethoxy propionic acid ethyl ester is employed as the $\beta,\beta,\beta$-trialkoxypropionic acid alkyl ester.

References Cited
FOREIGN PATENTS

| | | | |
|---|---|---|---|
| 1,129,333 | 10/1968 | Great Britain | 260—310 A |
| 1,129,334 | 10/1968 | Great Britain | 260—310 A |
| 1,134,329 | 11/1968 | Great Britain | 260—310 A |
| 1,176,478 | 8/1964 | Germany | 260—310 A |

NATALIE TROUSOF, Primary Examiner

U.S. Cl. X.R.

96—100; 260—484 R

UNITED STATES PATENT OFFICE
CERTIFICATE OF CORRECTION

PATENT NO. : 3,798,234
DATED : March 19, 1974
INVENTOR(S) : Ernst Meier and Karl Kuffner It is certified that error appears in the above-identified patent and that said Letters Patent are hereby corrected as shown below:

Column 5, line 11, "1-2" should read -- 1-3 -- .

Signed and Sealed this ninth Day of September 1975

[SEAL]

Attest:

RUTH C. MASON
*Attesting Officer*

C. MARSHALL DANN
*Commissioner of Patents and Trademarks*